(12) United States Patent
Lee (10) Patent No.: US 11,947,169 B2
(45) Date of Patent: Apr. 2, 2024

(54) PROTECTION ASSEMBLY OF OPTICAL FIBER SOCKET (71) Applicant: HSING CHAU INDUSTRIAL CO., LTD., Taipei (TW)

(72) Inventor: Kihai Lee, Taipei (TW)

(73) Assignee: HSING CHAU INDUSTRIAL CO., LTD., Taipei (TW)

(*) Notice: Subject to any disclaimer, the term of this patent is extended or adjusted under 35 U.S.C. 154(b) by 282 days.

(21) Appl. No.: 17/685,403

(22) Filed: Mar. 3, 2022

(65) Prior Publication Data
US 2023/0221497 A1    Jul. 13, 2023

(30) Foreign Application Priority Data

Jan. 13, 2022  (TW) .................................. 111101436

(51) Int. Cl.
G02B 6/38    (2006.01)

(52) U.S. Cl.
CPC .................. *G02B 6/3849* (2013.01)

(58) Field of Classification Search
CPC ................. G02B 6/38; G02B 6/3849
See application file for complete search history.

(56) References Cited

U.S. PATENT DOCUMENTS

| | | | | |
|---|---|---|---|---|
| 11,079,558 B1* | 8/2021 | Wang | ................... | G02B 6/4201 |
| 2011/0194828 A1* | 8/2011 | Hackett | ................ | G02B 6/3849 385/134 |
| 2011/0274401 A1* | 11/2011 | Hackett | ................ | G02B 6/3898 385/134 |
| 2011/0318949 A1* | 12/2011 | Adams | ................. | G02B 6/3879 439/304 |

* cited by examiner

*Primary Examiner* — Tina M Wong (57) ABSTRACT

A protection assembly of an optical fiber socket is disclosed. The optical fiber socket includes a first lock portion. The protection assembly includes a protection member and an unlock member. The protection member includes a hollow body inserted in the optical fiber socket and an elastic fastening structure. The hollow body has an unlock hole. The elastic fastening structure includes an unlock portion and a second lock portion for locking in the first lock portion. The unlock member includes a rod and a pushing protrusion provided at one end of the rod. When the second lock portion is locked in the first lock portion, the rod is adapted to be located inside the hollow body via the unlock hole, the pushing protrusion is adapted to push against the unlock portion along with a rotation of the rod.

10 Claims, 8 Drawing Sheets

PROTECTION ASSEMBLY OF OPTICAL FIBER SOCKET

CROSS-REFERENCE TO RELATED APPLICATION

This non-provisional application claims priority under 35 U.S.C. § 119(a) on Patent Application No(s). 111101436 filed in Taiwan, R.O.C. on Jan. 13, 2022, the entire contents of which are hereby incorporated by reference.

BACKGROUND OF THE INVENTION

1. Field of the Invention

The present disclosure relates to a protection assembly, and in particular to a protection assembly of an optical fiber socket.

2. Description of the Related Art

The optical fiber technology has been extensively applied in network transmissions in the recent years. Current hubs are mostly provided with optical fiber sockets for plugging converters, so as to convert optical signals into electrical signals to be read by an electronic device, or to convert electrical signals into optical signals to be transmitted by means of optical fibers.

However, an optical fiber socket not yet used may be intentionally misused, causing data leakage or a lagged network speed. Even if the optical fiber socket is free from the issues above, it may be deposited with dust if it is not put to use for an extended period of time, further affecting electrical characteristics of the optical fiber socket.

In the prior art, an insert member is available for protecting an optical fiber socket. However, a corresponding tool is needed in order to remove the insert member, and such conventional removal tool has issues of an overly large volume, excessively high production costs and operation complications.

BRIEF SUMMARY OF THE INVENTION

With dedicated research and development, the applicant has contemplated to provide a protection assembly of an optical fiber socket. The protection assembly includes a protection member inserted in the optical fiber socket to prevent the optical fiber socket from being used without permission and to provide dustproofness. The protection assembly further includes an unlock member with a light volume, a low cost and easy operability, so as to remove the protection member out of the optical fiber socket.

A protection assembly of an optical fiber socket is provided by the present invention. The optical fiber socket includes a first lock portion, and the protection assembly includes a protection member and an unlock member. The protection member includes a hollow body adapted to be inserted in the optical fiber socket, and an elastic fastening structure elastically connected inside the hollow body. The hollow body has an unlock hole, and the elastic fastening structure includes an unlock portion and a second lock portion, wherein the second lock portion is adapted to be locked in the first lock portion when the hollow body enters the optical fiber socket. The unlock member includes a rod and a pushing protrusion provided at an end of the rod. When the second lock portion is locked in the first lock portion, the rod is adapted to be located inside the hollow body via the unlock hole, and the pushing protrusion is adapted to push against the unlock portion along with a rotation of the rod, so as to linkingly move the second lock portion to depart from the first lock portion, thereby removing the protection member out of the optical fiber socket.

In one embodiment, a configuration of the rod and the pushing protrusion corresponds to a configuration of the unlock hole, and a first concave-convex structure is further provided next to the unlock hole on an outer side of the hollow body. The unlock member further includes a second concave-convex structure surrounding the rod and corresponding to the first concave-convex structure. Only when the second concave-convex structure is coupled to the first concave-convex structure, the pushing protrusion can enter the hollow body by a depth at which the unlock portion can be pushed against.

In one embodiment, a rotation margin is included in one of the first concave-convex structure and the second concave-convex structure that functions as a recess.

In one embodiment, the unlock hole includes a first part corresponding to the rod and a second part corresponding to the pushing protrusion, the first concave-convex structure is arranged along the first part, and the first concave-convex structure is connected to the second part or is spaced from the second part.

In one embodiment, the first concave-convex structure is connected to the second part or is spaced from the second part, and the first concave-convex structure occupies 10% to 50% of a peripheral length of the first part.

In one embodiment, the protection assembly further includes a stop collar provided in a projecting manner on an outer side of the hollow body and surrounding the unlock hole, the unlock member further includes an operating handle, and the rod is extended to a part of an end surface of the operating handle. When the pushing protrusion enters the hollow body by the depth at which the unlock portion can be pushed against, the end surface of the operating handle is abutted against the stop collar.

In one embodiment, the first lock portion is provided at a bottom wall of the optical fiber socket and is an elastic piece having a fastening hole, and the second lock portion is a projection for fitting into the fastening hole.

In one embodiment, the second lock portion has a sloped guide surface on one side away from the unlock hole. The sloped guide surface is for guiding the second lock portion to cross an end of the first lock portion so as to enter the fastening hole when the protection member enters the optical fiber socket.

In one embodiment, the elastic fastening structure further includes an elastic arm connected inside the hollow body, the unlock portion and the second lock portion are extended from the elastic arm and are two end portions with back surfaces facing each other, and the unlock portion further protrudes toward the unlock hole.

In one embodiment, a bottom portion of the hollow body has an opening for exposing the second lock portion.

Thus, the protection member of the protection assembly of the optical fiber socket of the present invention is capable of effectively locking the optical fiber socket, so as to prevent the optical fiber socket from being used without permission and to provide dustproofness. Moreover, the structure of the unlock member is simple, compact and light, and enables the protection member to be quickly removed out of the optical fiber socket by means of a simple rotation operation. Furthermore, the protection member and the unlock member do not require complicated structures and thus save production costs.

DETAILED DESCRIPTION OF THE INVENTION

To facilitate understanding of the object, characteristics and effects of the present disclosure, embodiments together with the attached drawings for the detailed description of the present disclosure are provided below.

Figure 1:
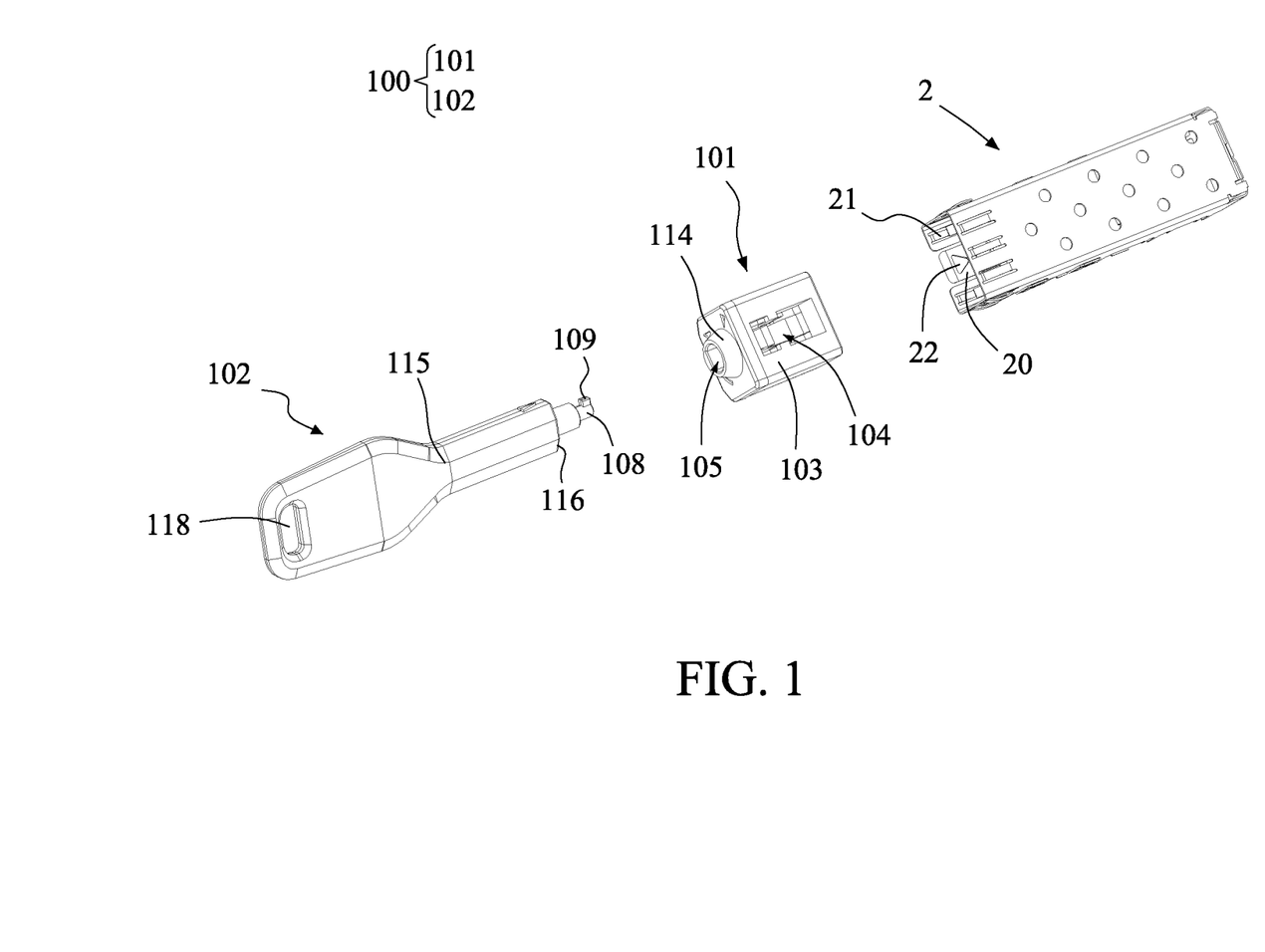
FIG. 1 is a three-dimensional schematic diagram of a protection assembly of an optical fiber socket and the optical fiber socket according to a specific embodiment of the present invention.
Figure 2:
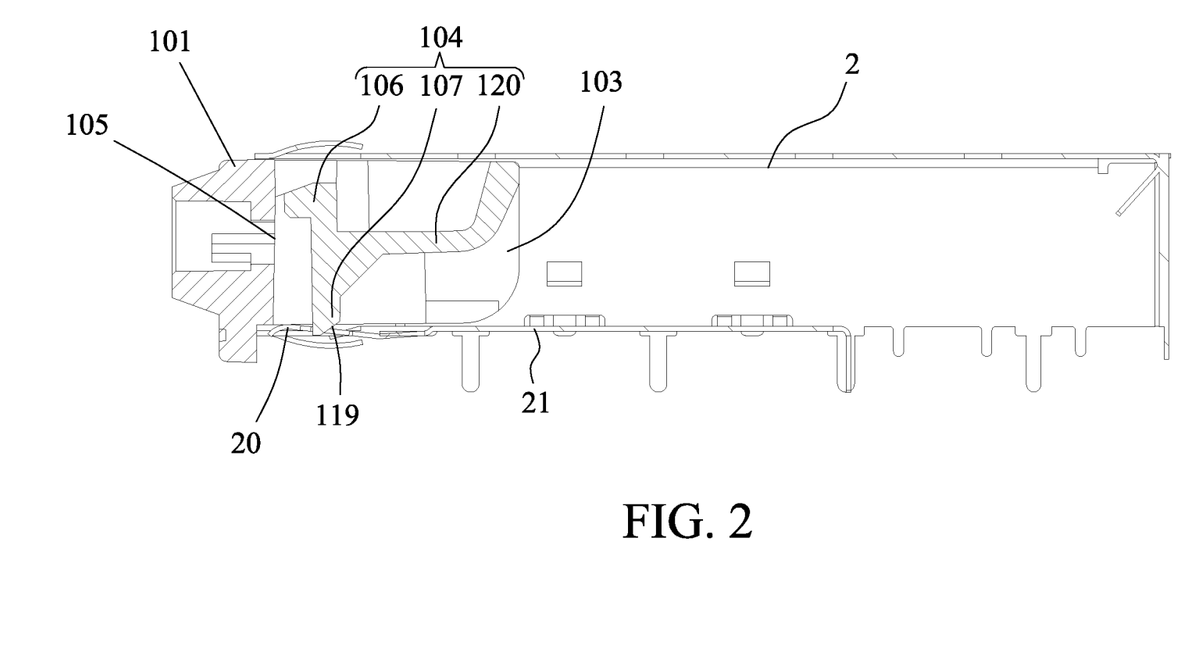
FIG. 2 is a cross-sectional schematic diagram of a protection member inserted in an optical fiber socket according to a specific embodiment of the present invention.
Figure 3:
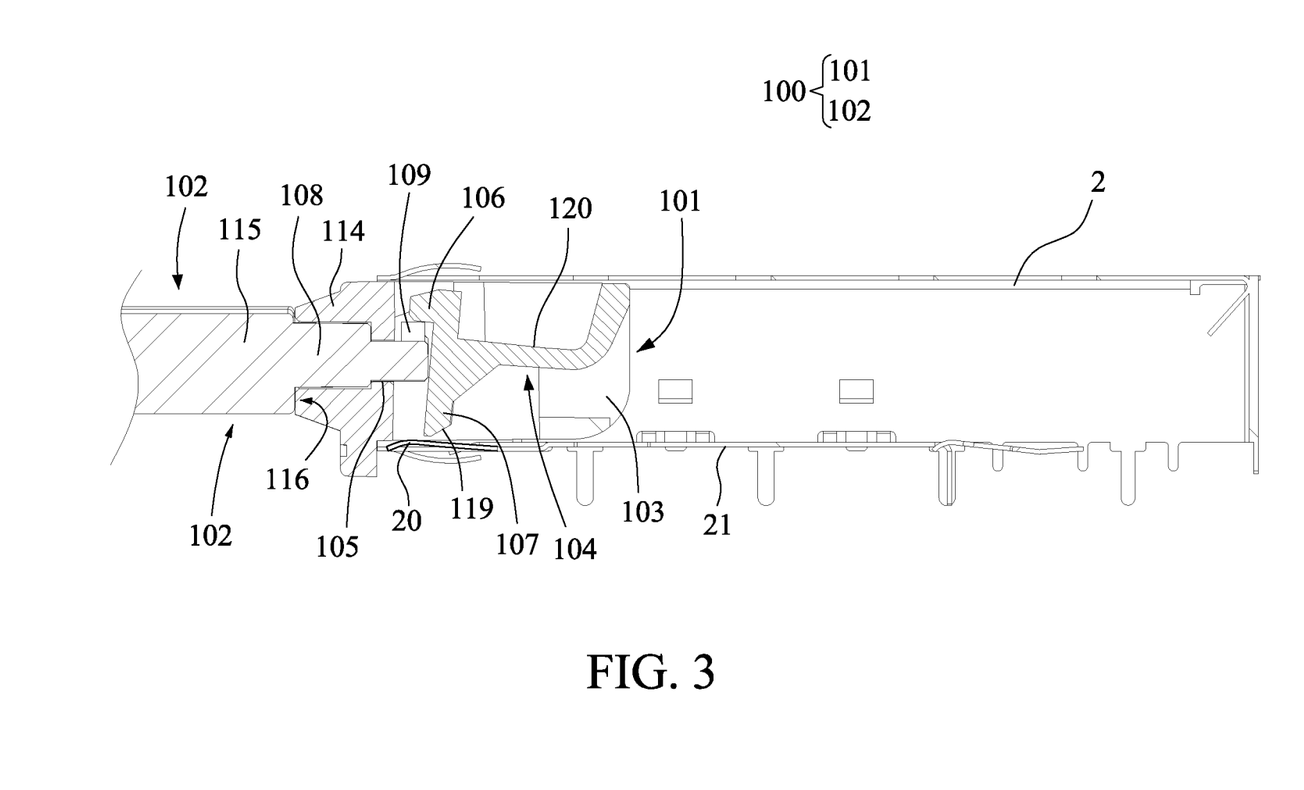
FIG. 3 is a cross-sectional schematic diagram of an unlock member unlocking a protection member from an optical fiber socket according to a specific embodiment of the present invention.

Referring to FIG. 1 to FIG. 6, as shown in FIG. 1, a protection assembly 100 of an optical fiber socket is provided by the present invention. The protection assembly 100 is applied to an optical fiber socket 2 which includes a first lock portion 20. The protection assembly 100 includes a protection member 101 and an unlock member 102. The protection member 101 includes a hollow body 103 adapted to be inserted in the optical fiber socket 2, and an elastic fastening structure 104 elastically connected inside the hollow body 103. The hollow body 103 has an unlock hole 105. As shown in FIG. 2 and FIG. 3, the elastic fastening structure 104 includes an unlock portion 106 and a second lock portion 107. The second lock portion 107 is adapted to be locked in the first lock portion 20 when the hollow body 103 enters the optical fiber socket 2. As shown in FIG. 1 and FIG. 3 to FIG. 5, the unlock member 102 includes a rod 108 and a pushing protrusion 109 provided at one end of the rod 108. The rod 108 is adapted to be located inside the hollow body 103 via the unlock hole 105, and the pushing protrusion 109 is adapted to push against the unlock portion 106 along with a rotation of the rod 108 so as to linkingly move the second lock portion 107 to depart from the first lock portion 20, thereby removing the protection member 101 out of the optical fiber socket 2. More specifically, when the second lock portion 107 is locked in the first lock portion 20, the rod 108 may be inserted into the hollow body 103 from the unlock hole 105, and the pushing protrusion 109 is caused by a rotation to push against the unlock portion 106, so as to move the second lock portion 107 away from the first lock portion 20, thereby removing the protection member 101 out of the optical fiber socket 2.

As described above, the protection member 101 of the protection assembly 100 of the present invention is capable of effectively locking the optical fiber socket 2, so as to prevent the optical fiber socket 2 from being used without permission and to provide dustproofness. Moreover, the structure of the unlock member 102 is simple, compact and light, and the protection member 101 can be quickly removed out of the optical fiber socket 2 by a simple rotation operation. Furthermore, the protection member 101 and the unlock member 102 do not need to have complicated structures and thus can save production costs. Both of the protection member 101 and the unlock member 102 can be integrally formed by injection molding from a single plastic material or made by three-dimensional printing, without involving processes such as welding or implanting of metal and plastic.

Figure 4:
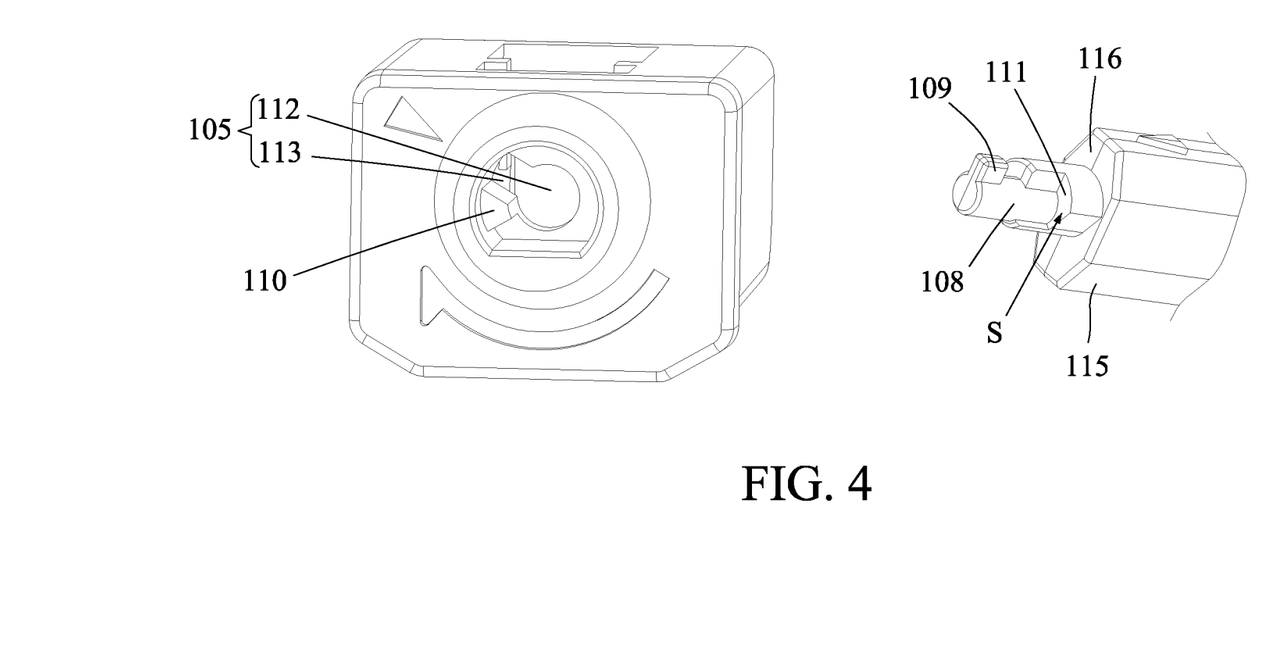
FIG. 4 is a three-dimensional partial schematic diagram of an unlock member and an outer side of a protection member according to a specific embodiment of the present invention.

As shown in FIG. 1 and FIG. 4, in one embodiment, a configuration of the rod 108 and the pushing protrusion 109 corresponds to a configuration of the unlock hole 105, so that the unlock member 102 is allowed to enter the protection member 101 in a predetermined rotation direction. A first concave-convex structure 110 is further provided next to the unlock hole 105 on an outer side of the hollow body 103. The unlock member 102 further includes a second concave-convex structure 111 surrounding the rod 108. The first concave-convex structure 110 and the second concave-convex structure 111 are complementary to each other in a depth direction. With reference to FIG. 3, it is seen that only when the second concave-convex structure 111 is coupled to the first concave-convex structure 110, the pushing protrusion 109 can then enter the hollow body 103 by a depth at which the unlock portion 106 can be pushed against. A rotation margin S is included in one of the first concave-convex structure 110 and the second concave-convex structure 111 that functions as a recess, so that the second concave-convex structure 111 can rotate along with the rod 108, providing the pushing protrusion 109 at the end of the rod 108 with a sufficient rotation stroke to push against the unlock portion 106. In FIG. 4, the second concave-convex structure 111 is a recess and is provided with the rotation margin S, the first concave-convex structure 110 is a projection, and the first concave-convex structure 110 moving within the range of the second concave-convex structure 111 can define the rotation stroke of the rod 108. It should be noted that the present invention is not limited to the examples above.

Figure 7:
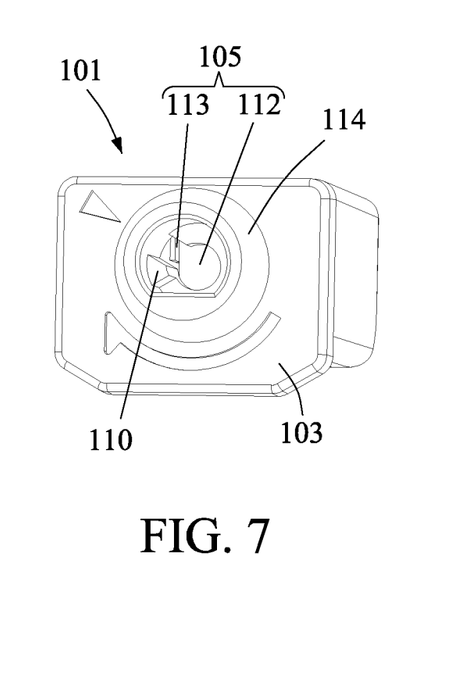
FIG. 7 is a first three-dimensional schematic diagram of a protection member according to a specific embodiment of the present invention.
Figure 8:
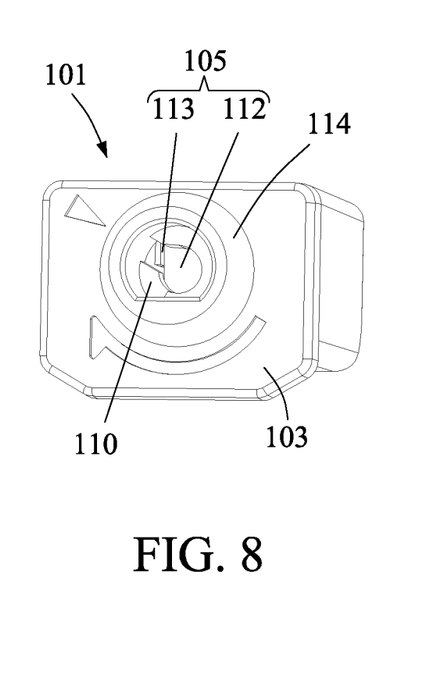
FIG. 8 is a second three-dimensional schematic diagram of a protection member according to a specific embodiment of the present invention.
Figure 9:
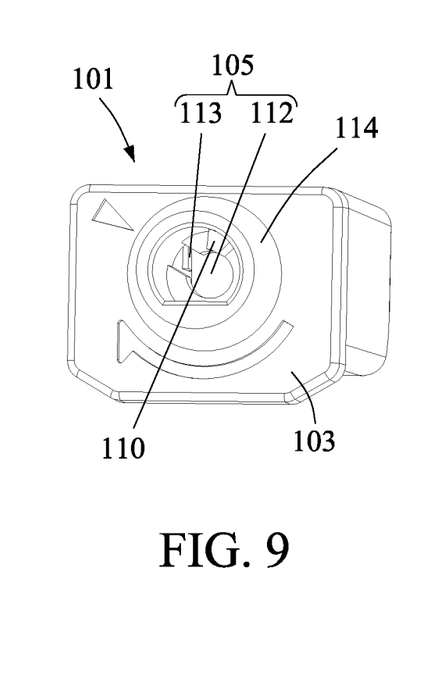
FIG. 9 is a third three-dimensional schematic diagram of a protection member according to a specific embodiment of the present invention.
Figure 10:
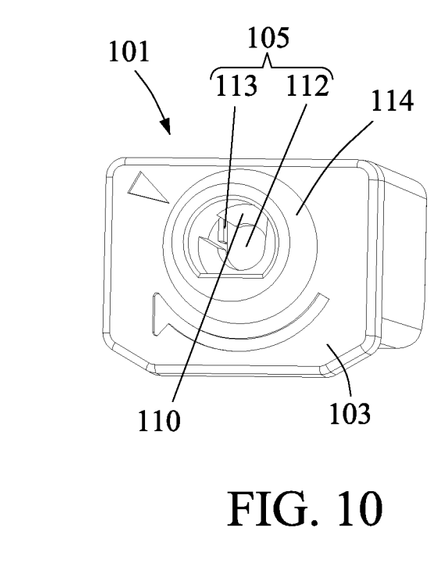
FIG. 10 is a fourth three-dimensional schematic diagram of a protection member according to a specific embodiment of the present invention.
Figure 11:
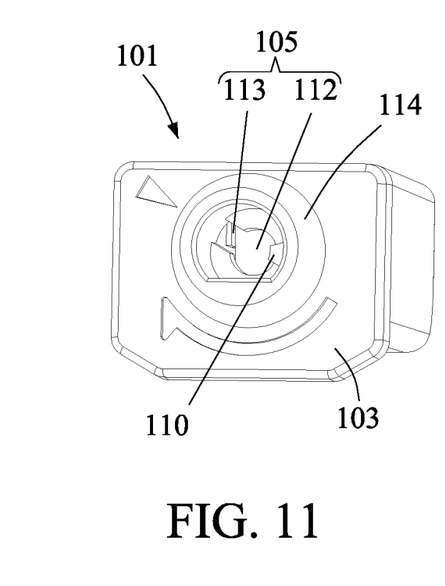
FIG. 11 is a fifth three-dimensional schematic diagram of a protection member according to a specific embodiment of the present invention.
Figure 12:
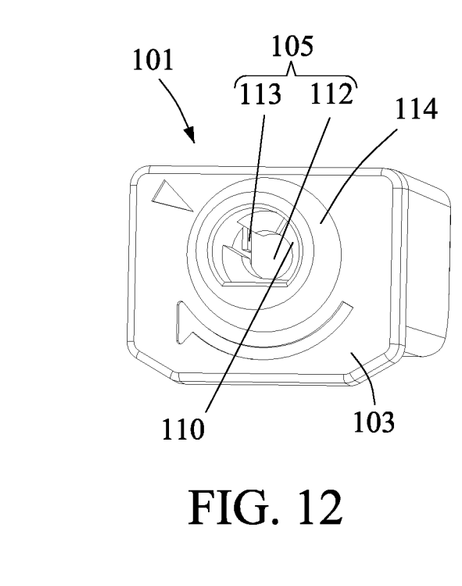
FIG. 12 is a sixth three-dimensional schematic diagram of a protection member according to a specific embodiment of the present invention.

As shown in FIG. 4 and FIG. 7 to FIG. 12, in one embodiment, the unlock hole 105 may include a first part 112 corresponding to the rod 108 and a second part 113 corresponding to the pushing protrusion 109. The first concave-convex structure 110 is arranged along the first part 112 of the unlock hole 105, and can be connected to the second part 113 (as shown in FIG. 7, FIG. 8 and FIG. 10) or be spaced from the second part 113 (as shown in FIG. 9, FIG. 11 and FIG. 12) of the unlock hole 105. In FIG. 7, FIG. 9 and FIG. 11, the first concave-convex structure 110 is a projection, and in FIG. 8, FIG. 10 and FIG. 12, the first concave-convex structure 110 is a recess. The first concave-convex structure 110 may be regarded as a recess or a projection, and occupies 10% to 50% of a peripheral length of the first part 112. For example, the first concave-convex structure 110 can occupy a higher percentage when it is a recess, and can occupy a lower percentage when it is a projection. The position relative to the second part 113 and the depth, thickness and length of the recess or projection of the first concave-convex structure 110 can define the form of the corresponding unlock member 102. As shown in FIG. 7 to FIG. 12, a manufacturer can manufacture a plurality of sets of differently structured protection members 101, and the corresponding unlock member 102 needs to be used in order to remove the protection member 101 out of the optical fiber socket 2 instead of using the same unlock member 102 to unlock different protection members 101. However, the protection member 101 and the unlock member 102 of the present invention are different form conventional keys and locks having complicated structures. The protection assembly 100 of the present invention is capable of achieving balance between manufacturing costs and protection effects by means of a simple but effective structure.

Figure 6:
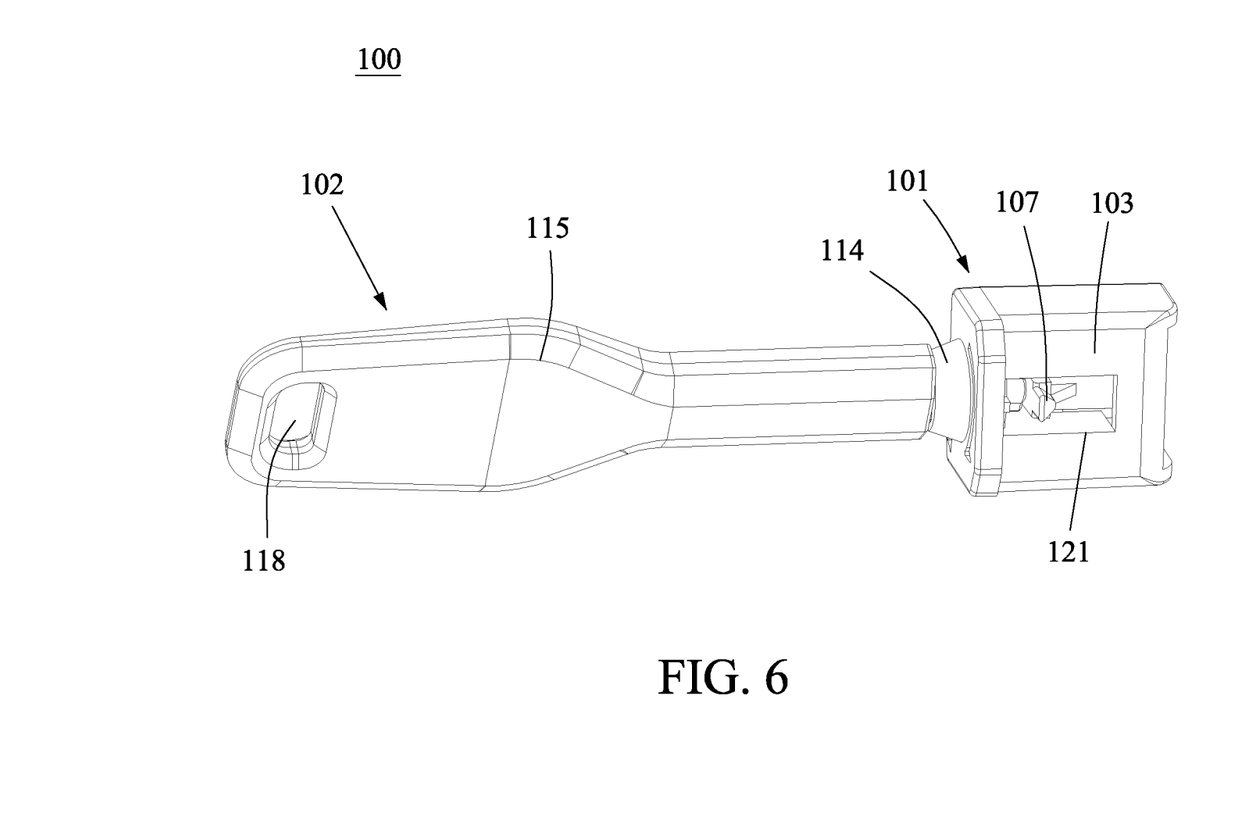
FIG. 6 is a three-dimensional schematic diagram of a protection assembly of an optical fiber socket when an unlock member is inserted in the protection member according to a specific embodiment of the present invention.

As shown in FIG. 1 and FIG. 3, in one embodiment, the protection member 101 may further include a stop collar 114 provided in a projecting manner on an outer side of the hollow body 103 and surrounding the unlock hole 105, the unlock member 102 may further include an operating handle 115, and the rod 108 is extended to a part of an end surface 116 of the operating handle 115. When the pushing protrusion 109 enters the hollow body 103 by the depth at which the unlock portion 106 can be pushed against, the end surface 116 of the operating handle 115 is abutted against the stop collar 114. The stop collar 114 can withstand the impact force generated when the unlock member 102 is inserted into the protection member 101 and in collaboration ensure the depth at which the pushing protrusion 109 enters the hollow body 103. Moreover, as shown in FIG. 1 and FIG. 6, the operating handle 115 may further have an opening 118 at one end away from the rod 108 for a collecting member (not shown) such as a key ring to pass through.

As shown in FIG. 1 to FIG. 3 and FIG. 5, in one embodiment, the first lock portion 20 of the optical fiber socket 2 is provided at a bottom wall 21 of the optical fiber socket 2 and is an elastic piece having a fastening hole 22. The lock portion 107 is, for example, a projection for fitting into the fastening hole 22. The second lock portion 107 may have a sloped guide surface 119 on one side away from the unlock hole 105. The sloped guide surface 119 is for guiding the second lock portion 107 to cross an end of the first lock portion 20 so as to enter the fastening hole 22 when the protection member 101 enters the optical fiber socket 2.

The elastic fastening structure 104 may further include an elastic arm 120 connected inside the hollow body 103 to provide the second lock portion 107 with an elastic force for converting between locking and unlocking. The unlock portion 106 and the second lock portion 107 may be two end portions extended from the elastic arm 120 and having back surfaces facing each other, and the unlock portion 106 further protrudes toward the unlock hole 105 so as to press against the pushing protrusion 109. As shown in FIG. 6, a bottom portion of the hollow body 103 may have an opening 121 for exposing the second lock portion 107.

Figure 5:
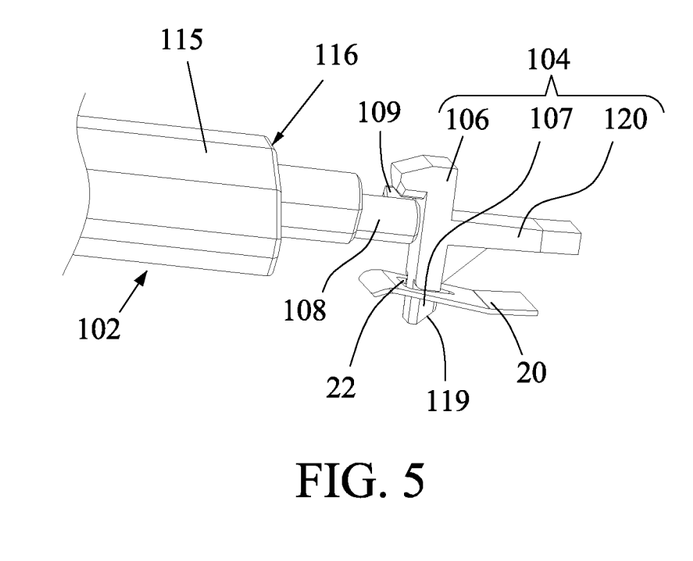
FIG. 5 is a three-dimensional schematic diagram of an unlock member, an elastic fastening structure and a first lock portion according to a specific embodiment of the present invention.

As shown in FIG. 2 and FIG. 5, the protection member 101 may be directly pushed into the optical fiber socket 2, and the second lock portion 107 may enter the fastening hole 22 and be automatically locked in the first lock portion 20.

As shown in FIG. 3 as well as FIG. 5, the unlock member 102 is inserted into the protection member 101 and then rotated, the pushing protrusion 109 may push against the unlock portion 106 to cause the elastic arm 120 to curve upward, further lifting the second lock portion 107 relative to the unlock portion 106 and have the second lock portion 107 be departed from the fastening hole 22 of the first lock portion 20. At this point in time, the protection member 101 may be removed out of the optical fiber socket 2.

The present disclosure has been described by means of specific embodiments above; however, it should be noted by those skilled in the art that the embodiments are only illustrative of the present disclosure and do not pose any limitation on the scope of the present disclosure. It should be also noted that, numerous variations and substitutions equivalent to the embodiments are encompassed within the scope of the present disclosure. Accordingly, the scope of the legal protection of the present disclosure should be defined by the appended claims.

What is claimed is:

1. A protection assembly of an optical fiber socket, the optical fiber socket comprising a first lock portion, the protection assembly comprising:
   a protection member, comprising a hollow body adapted to be inserted in the optical fiber socket, and an elastic fastening structure elastically connected inside the hollow body, the hollow body having an unlock hole, the elastic fastening structure comprising an unlock portion and a second lock portion, the second lock portion being adapted to be locked in the first lock portion when the hollow body enters the optical fiber socket; and
   an unlock member, comprising a rod and a pushing protrusion provided at an end of the rod, the rod adapted to be located inside the hollow body via the unlock hole, the pushing protrusion adapted to push against the unlock portion along with a rotation of the rod to linkingly move the second lock portion to depart from the first lock portion, thereby removing the protection member out of the optical fiber socket.

2. The protection assembly of an optical fiber socket according to claim 1, wherein a configuration of the rod and the pushing protrusion corresponds to a configuration of the unlock hole, a first concave-convex structure is further provided next to the unlock hole on an outer side of the hollow body, the unlock member further comprises a second concave-convex structure surrounding the rod and corresponding to the first concave-convex structure, and only when the second concave-convex structure is coupled to the first concave-convex structure, the pushing protrusion can enter the hollow body by a depth at which the unlock portion can be pushed against.

3. The protection assembly of an optical fiber socket according to claim 2, wherein a rotation margin is included in one of the first concave-convex structure and the second concave-convex structure that functions as a recess.

4. The protection assembly of an optical fiber socket according to claim 2, wherein the unlock hole comprises a first part corresponding to the rod and a second part corresponding to the pushing protrusion, the first concave-convex structure is arranged along the first part, and the first concave-convex structure is connected to the second part or is spaced from the second part.

5. The protection assembly of an optical fiber socket according to claim 4, wherein the first concave-convex structure occupies 10% to 50% of a peripheral length of the first part.

6. The protection assembly of an optical fiber socket according to claim 1, wherein the protection member further comprises a stop collar provided in a projecting manner on an outer side of the hollow body and surrounding the unlock hole, the unlock member further comprises an operating handle, the rod is extended to a part of an end surface of the operating handle, and the end surface of the operating handle is abutted against the stop collar when the pushing protrusion enters the hollow body by a depth at which the unlock portion can be pushed against.

7. The protection assembly of an optical fiber socket according to claim 1, wherein the first lock portion is provided at a bottom wall of the optical fiber socket and is an elastic piece having a fastening hole, and the second lock portion is a projection for fitting into the fastening hole.

8. The protection assembly of an optical fiber socket according to claim 7, wherein the second lock portion has a sloped guide surface on one side away from the unlock hole, and the sloped guide surface is for guiding the second lock portion to cross an end of the first lock portion so as to enter the fastening hole when the protection member enters the optical fiber socket.

9. The protection assembly of an optical fiber socket according to claim 1, wherein the elastic fastening structure further comprises an elastic arm connected inside the hollow body, the unlock portion and the second lock portion are extended from the elastic arm and are two end portions having back surfaces facing each other, and the unlock portion further protrudes toward the unlock hole.

10. The protection assembly of an optical fiber socket according to claim 1, wherein a bottom portion of the hollow body has an opening for exposing the second lock portion.

* * * * *